United States Patent
Sigle

(10) Patent No.: US 12,534,022 B2
(45) Date of Patent: *Jan. 27, 2026

(54) VEHICLE VISION SYSTEM WITH ELECTRICAL NOISE FILTERING CIRCUITRY

(71) Applicant: MAGNA ELECTRONICS INC., Auburn Hills, MI (US)

(72) Inventor: Marc-Andrè Sigle, Alzenau (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/907,701

(22) Filed: Oct. 7, 2024

(65) Prior Publication Data

US 2025/0026268 A1 Jan. 23, 2025

Related U.S. Application Data

(63) Continuation of application No. 17/656,072, filed on Mar. 23, 2022, now Pat. No. 12,115,915, which is a continuation of application No. 15/379,800, filed on Dec. 15, 2016, now Pat. No. 11,285,878.

(60) Provisional application No. 62/268,742, filed on Dec. 17, 2015.

(51) Int. Cl.
*B60R 1/12* (2006.01)
*H04N 7/18* (2006.01)

(52) U.S. Cl.
CPC ............... *B60R 1/12* (2013.01); *H04N 7/181* (2013.01)

(58) Field of Classification Search
CPC ........ B60R 1/12; H04N 7/181; H04N 5/2251; H04N 5/23241; H04N 5/228
See application file for complete search history.

(56) References Cited

U.S. PATENT DOCUMENTS

| | | | |
|---|---|---|---|
| 4,443,769 A | 4/1984 | Aschwanden et al. |
| 4,485,398 A | 11/1984 | Chapin, Jr. et al. |
| 4,987,357 A | 1/1991 | Masaki |

(Continued)

OTHER PUBLICATIONS

"Vehicle Rear Vision System With Moveable Camera" - An IP.com Prior Art Database Technical Disclosure; IP.com Electronic Publication Date: Sep. 19, 2006. (Year: 2006).*

(Continued)

*Primary Examiner* — Mainul Hasan
(74) *Attorney, Agent, or Firm* — HONIGMAN LLP

(57) ABSTRACT

A vehicular vision system includes a camera disposed at a vehicle and an electronic control unit (ECU) disposed at the vehicle remote from the camera. The ECU links to a vehicle network bus of the vehicle. The camera is connected to the ECU via an image data transmission line, which includes (i) a power-over-coaxial image data transmission line or (ii) a power-over-ethernet image data transmission line. The image data transmission line (i) transmits image data captured by the camera to the ECU and (ii) delivers electrical power from the ECU to the camera and (iii) communicates a control signal from the ECU to the camera. Captured image data is processed at the ECU for at least one driver assistance system of the vehicle. Filtering circuitry that filters electrical noise arising at least from delivery of electrical power via the image data transmission line from the ECU to the vehicular camera.

41 Claims, 4 Drawing Sheets

(56) References Cited

U.S. PATENT DOCUMENTS

| | | |
|---|---|---|
| 4,991,054 A | 2/1991 | Walters |
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,044,706 A | 9/1991 | Chen |
| 5,055,668 A | 10/1991 | French |
| 5,059,877 A | 10/1991 | Teder |
| 5,064,274 A | 11/1991 | Alten |
| 5,072,154 A | 12/1991 | Chen |
| 5,086,253 A | 2/1992 | Lawler |
| 5,096,287 A | 3/1992 | Kakinami et al. |
| 5,097,362 A | 3/1992 | Lynas |
| 5,121,200 A | 6/1992 | Choi |
| 5,124,549 A | 6/1992 | Michaels et al. |
| 5,130,709 A | 7/1992 | Toyama et al. |
| 5,168,378 A | 12/1992 | Black |
| 5,170,374 A | 12/1992 | Shimohigashi et al. |
| 5,172,235 A | 12/1992 | Wilm et al. |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,204,778 A | 4/1993 | Bechtel |
| 5,208,701 A | 5/1993 | Maeda |
| 5,245,422 A | 9/1993 | Borcherts et al. |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,498,866 A | 3/1996 | Bendicks et al. |
| 5,500,766 A | 3/1996 | Stonecypher |
| 5,510,983 A | 4/1996 | Lino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,555 A | 9/1996 | Sato et al. |
| 5,568,027 A | 10/1996 | Teder |
| 5,574,443 A | 11/1996 | Hsieh |
| 5,581,464 A | 12/1996 | Woll et al. |
| 5,594,222 A | 1/1997 | Caldwell |
| 5,614,788 A | 3/1997 | Mullins |
| 5,619,370 A | 4/1997 | Guinosso |
| 5,632,092 A | 5/1997 | Blank et al. |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,670,935 A | 9/1997 | Schofield et al. |
| 5,677,851 A | 10/1997 | Kingdon et al. |
| 5,699,044 A | 12/1997 | Van Lente et al. |
| 5,724,316 A | 3/1998 | Brunts |
| 5,732,379 A | 3/1998 | Eckert et al. |
| 5,737,226 A | 4/1998 | Olson et al. |
| 5,760,828 A | 6/1998 | Cortes |
| 5,760,931 A | 6/1998 | Saburi et al. |
| 5,761,094 A | 6/1998 | Olson et al. |
| 5,765,116 A | 6/1998 | Wilson-Jones et al. |
| 5,765,118 A | 6/1998 | Fukatani |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,835,255 A | 11/1998 | Miles |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,357 A | 3/1999 | Sivashankar et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,915,800 A | 6/1999 | Hiwatashi et al. |
| 5,923,027 A | 7/1999 | Stam et al. |
| 5,924,212 A | 7/1999 | Domanski |
| 5,949,331 A | 9/1999 | Schofield et al. |
| 5,959,555 A | 9/1999 | Furuta |
| 5,963,247 A | 10/1999 | Banitt |
| 5,986,796 A | 11/1999 | Miles |
| 5,990,469 A | 11/1999 | Bechtel et al. |
| 5,990,649 A | 11/1999 | Nagao et al. |
| 6,020,704 A | 2/2000 | Buschur |
| 6,049,171 A | 4/2000 | Stam et al. |
| 6,066,933 A | 5/2000 | Ponziana |
| 6,084,519 A | 7/2000 | Coulling et al. |
| 6,097,024 A | 8/2000 | Stam et al. |
| 6,100,799 A | 8/2000 | Fenk |
| 6,115,159 A | 9/2000 | Baker |
| 6,144,022 A | 11/2000 | Tenenbaum et al. |
| 6,175,300 B1 | 1/2001 | Kendrick |
| 6,178,034 B1 | 1/2001 | Allemand et al. |
| 6,201,642 B1 | 3/2001 | Bos |
| 6,223,114 B1 | 4/2001 | Boros et al. |

(56) References Cited

U.S. PATENT DOCUMENTS

| | | |
|---|---|---|
| 6,227,689 B1 | 5/2001 | Miller |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,294,989 B1 | 9/2001 | Schofield et al. |
| 6,297,781 B1 | 10/2001 | Turnbull et al. |
| 6,310,611 B1 | 10/2001 | Caldwell |
| 6,317,057 B1 | 11/2001 | Lee |
| 6,320,282 B1 | 11/2001 | Caldwell |
| 6,333,759 B1 | 12/2001 | Mazzilli |
| 6,353,392 B1 | 3/2002 | Schofield et al. |
| 6,370,329 B1 | 4/2002 | Teuchert |
| 6,392,315 B1 | 5/2002 | Jones et al. |
| 6,396,397 B1 | 5/2002 | Bos et al. |
| 6,411,204 B1 | 6/2002 | Bloomfield et al. |
| 6,424,273 B1 | 7/2002 | Gutta et al. |
| 6,430,303 B1 | 8/2002 | Naoi et al. |
| 6,442,465 B2 | 8/2002 | Breed et al. |
| 6,477,464 B2 | 11/2002 | McCarthy et al. |
| 6,497,503 B1 | 12/2002 | Dassanayake et al. |
| 6,498,620 B2 | 12/2002 | Schofield et al. |
| 6,534,884 B2 | 3/2003 | Marcus et al. |
| 6,539,306 B2 | 3/2003 | Turnbull |
| 6,547,133 B1 | 4/2003 | Devries, Jr. et al. |
| 6,553,130 B1 | 4/2003 | Lemelson et al. |
| 6,574,033 B1 | 6/2003 | Chui et al. |
| 6,589,625 B1 | 7/2003 | Kothari et al. |
| 6,594,583 B2 | 7/2003 | Ogura et al. |
| 6,611,610 B1 | 8/2003 | Stam et al. |
| 6,636,258 B2 | 10/2003 | Strumolo |
| 6,650,455 B2 | 11/2003 | Miles |
| 6,672,731 B2 | 1/2004 | Schnell et al. |
| 6,674,562 B1 | 1/2004 | Miles |
| 6,680,792 B2 | 1/2004 | Miles |
| 6,690,268 B2 | 2/2004 | Schofield et al. |
| 6,700,605 B1 | 3/2004 | Toyoda et al. |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,735,506 B2 | 5/2004 | Breed et al. |
| 6,741,377 B2 | 5/2004 | Miles |
| 6,744,353 B2 | 6/2004 | Sjonell |
| 6,757,109 B2 | 6/2004 | Bos |
| 6,762,867 B2 | 7/2004 | Lippert et al. |
| 6,794,119 B2 | 9/2004 | Miles |
| 6,795,221 B1 | 9/2004 | Urey |
| 6,806,452 B2 | 10/2004 | Bos et al. |
| 6,819,231 B2 | 11/2004 | Berberich et al. |
| 6,823,241 B2 | 11/2004 | Shirato et al. |
| 6,824,281 B2 | 11/2004 | Schofield et al. |
| 6,850,156 B2 | 2/2005 | Bloomfield et al. |
| 6,889,161 B2 | 5/2005 | Winner et al. |
| 6,909,753 B2 | 6/2005 | Meehan et al. |
| 6,946,978 B2 | 9/2005 | Schofield |
| 6,975,775 B2 | 12/2005 | Rykowski et al. |
| 6,989,736 B2 | 1/2006 | Berberich et al. |
| 7,004,606 B2 | 2/2006 | Schofield |
| 7,038,577 B2 | 5/2006 | Pawlicki et al. |
| 7,062,300 B1 | 6/2006 | Kim |
| 7,065,432 B2 | 6/2006 | Moisel et al. |
| 7,079,017 B2 | 7/2006 | Lang et al. |
| 7,085,637 B2 | 8/2006 | Breed et al. |
| 7,092,548 B2 | 8/2006 | Laumeyer et al. |
| 7,111,968 B2 | 9/2006 | Bauer et al. |
| 7,116,246 B2 | 10/2006 | Winter et al. |
| 7,123,168 B2 | 10/2006 | Schofield |
| 7,136,753 B2 | 11/2006 | Samukawa et al. |
| 7,145,519 B2 | 12/2006 | Takahashi et al. |
| 7,149,613 B2 | 12/2006 | Stam et al. |
| 7,161,616 B1 | 1/2007 | Okamoto et al. |
| 7,195,381 B2 | 3/2007 | Lynam et al. |
| 7,202,776 B2 | 4/2007 | Breed |
| 7,227,611 B2 | 6/2007 | Hull et al. |
| 7,365,769 B1 | 4/2008 | Mager |
| 7,381,089 B2 | 6/2008 | Hosler, Sr. |
| 7,460,951 B2 | 12/2008 | Altan |
| 7,490,007 B2 | 2/2009 | Taylor et al. |
| 7,526,103 B2 | 4/2009 | Schofield et al. |
| 7,592,928 B2 | 9/2009 | Chinomi et al. |
| 7,639,149 B2 | 12/2009 | Katoh |
| 7,681,960 B2 | 3/2010 | Wanke et al. |
| 7,720,580 B2 | 5/2010 | Higgins-Luthman |
| 7,724,962 B2 | 5/2010 | Zhu et al. |
| 7,843,235 B2 | 11/2010 | Yanbo et al. |
| 7,855,755 B2 | 12/2010 | Weller et al. |
| 7,881,496 B2 | 2/2011 | Camilleri et al. |
| 7,952,490 B2 | 5/2011 | Fechner et al. |
| 7,965,336 B2 | 6/2011 | Bingle et al. |
| 8,013,780 B2 | 9/2011 | Lynam |
| 8,027,029 B2 | 9/2011 | Lu et al. |
| 8,503,061 B2 | 8/2013 | Uken et al. |
| 8,542,451 B2 | 9/2013 | Lu et al. |
| 8,849,495 B2 | 9/2014 | Chundrik, Jr. et al. |
| 8,866,907 B2 | 10/2014 | McElroy et al. |
| 8,897,178 B2 | 11/2014 | Devuyst et al. |
| 8,908,039 B2 | 12/2014 | De Wind et al. |
| 9,036,026 B2 | 5/2015 | Dellantoni et al. |
| 9,041,806 B2 | 5/2015 | Baur et al. |
| 9,126,525 B2 | 9/2015 | Lynam et al. |
| 9,210,307 B2 | 12/2015 | Gebauer et al. |
| 9,233,641 B2 | 1/2016 | Sesti et al. |
| 9,609,757 B2 | 3/2017 | Steigerwald |
| 9,900,490 B2 | 2/2018 | Ihlenburg et al. |
| 10,071,687 B2 | 9/2018 | Ihlenburg et al. |
| 10,284,764 B2 | 5/2019 | Ihlenburg et al. |
| 10,567,633 B2 | 2/2020 | Ihlenburg et al. |
| 10,567,705 B2 | 2/2020 | Ziegenspeck et al. |
| 10,827,108 B2 | 11/2020 | Ihlenburg et al. |
| 11,201,994 B2 | 12/2021 | Ihlenburg et al. |
| 11,285,878 B2 * | 3/2022 | Sigle ................ B60R 1/12 |
| 12,115,915 B2 | 10/2024 | Sigle |
| 2002/0015153 A1 | 2/2002 | Downs |
| 2002/0037054 A1 | 3/2002 | Schurig |
| 2002/0113873 A1 | 8/2002 | Williams |
| 2002/0149679 A1 | 10/2002 | Deangelis et al. |
| 2002/0167589 A1 | 11/2002 | Schofield et al. |
| 2003/0081120 A1 | 5/2003 | Klindworth |
| 2003/0103141 A1 | 6/2003 | Bechtel et al. |
| 2003/0137586 A1 | 7/2003 | Lewellen |
| 2003/0222982 A1 | 12/2003 | Hamdan et al. |
| 2004/0114381 A1 | 6/2004 | Salmeen et al. |
| 2005/0200467 A1 | 9/2005 | Au et al. |
| 2006/0017807 A1 | 1/2006 | Lee et al. |
| 2006/0018511 A1 | 1/2006 | Stam et al. |
| 2006/0018512 A1 | 1/2006 | Stam et al. |
| 2006/0023105 A1 | 2/2006 | Kostrzewski et al. |
| 2006/0091813 A1 | 5/2006 | Stam et al. |
| 2006/0103727 A1 | 5/2006 | Tseng |
| 2006/0125919 A1* | 6/2006 | Camilleri ........... H04N 7/188 348/148 |
| 2006/0164221 A1 | 7/2006 | Jensen |
| 2006/0184297 A1 | 8/2006 | Higgins-Luthman |
| 2006/0206243 A1 | 9/2006 | Pawlicki et al. |
| 2006/0212624 A1 | 9/2006 | Kim |
| 2006/0250501 A1 | 11/2006 | Widmann et al. |
| 2006/0254805 A1 | 11/2006 | Scherer et al. |
| 2006/0290479 A1 | 12/2006 | Akatsuka et al. |
| 2007/0104476 A1 | 5/2007 | Yasutomi et al. |
| 2007/0206835 A1 | 9/2007 | Abe |
| 2007/0297784 A1 | 12/2007 | Wong et al. |
| 2008/0042812 A1 | 2/2008 | Dunsmoir et al. |
| 2009/0093938 A1 | 4/2009 | Isaji et al. |
| 2009/0113509 A1 | 4/2009 | Tseng et al. |
| 2009/0152943 A1* | 6/2009 | Diab ............... B60R 16/023 307/10.1 |
| 2009/0174765 A1 | 7/2009 | Namba et al. |
| 2009/0177347 A1 | 7/2009 | Breuer et al. |
| 2009/0243824 A1 | 10/2009 | Peterson et al. |
| 2009/0244361 A1 | 10/2009 | Gebauer et al. |
| 2009/0265069 A1 | 10/2009 | Desbrunes |
| 2010/0002081 A1 | 1/2010 | Pawlicki et al. |
| 2010/0020170 A1 | 1/2010 | Higgins-Luthman et al. |

(56) References Cited

U.S. PATENT DOCUMENTS

| | | |
|---|---|---|
| 2010/0045799 A1 | 2/2010 | Lei et al. |
| 2010/0076621 A1 | 3/2010 | Kubotani et al. |
| 2010/0194886 A1 | 8/2010 | Asari et al. |
| 2010/0228437 A1 | 9/2010 | Hanzawa et al. |
| 2011/0025489 A1 | 2/2011 | Shimoda et al. |
| 2011/0074916 A1 | 3/2011 | Demirdjian |
| 2011/0095908 A1 | 4/2011 | Nadeem et al. |
| 2011/0103650 A1 | 5/2011 | Cheng et al. |
| 2011/0193961 A1* | 8/2011 | Peterson ............... H04N 7/183 348/148 |
| 2011/0286544 A1 | 11/2011 | Avudainayagam et al. |
| 2012/0044066 A1 | 2/2012 | Mauderer et al. |
| 2012/0050550 A1 | 3/2012 | Oba et al. |
| 2012/0062743 A1 | 3/2012 | Lynam et al. |
| 2012/0154591 A1* | 6/2012 | Baur ....................... B60R 1/04 348/148 |
| 2012/0186447 A1 | 7/2012 | Hodgson et al. |
| 2012/0218412 A1 | 8/2012 | Dellantoni et al. |
| 2012/0262340 A1 | 10/2012 | Hassan et al. |
| 2013/0033599 A1* | 2/2013 | Dayan ................... B60K 35/10 348/148 |
| 2013/0124052 A1 | 5/2013 | Hahne |
| 2013/0129150 A1 | 5/2013 | Saito |
| 2013/0131918 A1 | 5/2013 | Hahne |
| 2013/0134964 A1 | 5/2013 | Ahrentorp et al. |
| 2013/0187445 A1 | 7/2013 | Mutzabaugh |
| 2013/0194381 A1* | 8/2013 | McMahon ........... H04N 21/422 348/148 |
| 2013/0222595 A1 | 8/2013 | Gebauer et al. |
| 2013/0242099 A1 | 9/2013 | Sauer et al. |
| 2013/0314503 A1 | 11/2013 | Nix et al. |
| 2013/0321632 A1* | 12/2013 | Nix ........................ H04N 7/181 348/148 |
| 2013/0328672 A1 | 12/2013 | Sesti et al. |
| 2013/0344736 A1 | 12/2013 | Latunski |
| 2014/0067206 A1 | 3/2014 | Pflug |
| 2014/0138140 A1 | 5/2014 | Sigle |
| 2014/0152778 A1 | 6/2014 | Ihlenburg et al. |
| 2014/0156157 A1 | 6/2014 | Johnson et al. |
| 2014/0160291 A1 | 6/2014 | Schaffner |
| 2014/0176711 A1 | 6/2014 | Kirchner et al. |
| 2014/0218535 A1 | 8/2014 | Ihlenburg et al. |
| 2014/0222280 A1 | 8/2014 | Salomonsson et al. |
| 2014/0313339 A1* | 10/2014 | Diessner .................. H04N 7/18 348/148 |
| 2014/0320636 A1 | 10/2014 | Bally et al. |
| 2014/0340510 A1 | 11/2014 | Ihlenburg et al. |
| 2014/0362209 A1* | 12/2014 | Ziegenspeck ............ H04N 7/10 348/113 |
| 2014/0373345 A1 | 12/2014 | Steigerwald |
| 2014/0379233 A1 | 12/2014 | Chundrlik, Jr. et al. |
| 2015/0042807 A1 | 2/2015 | Ihlenburg et al. |
| 2015/0062342 A1* | 3/2015 | Hoek ....................... B60R 1/04 348/148 |
| 2015/0222795 A1 | 8/2015 | Sauer et al. |
| 2015/0266430 A1 | 9/2015 | Mleczko et al. |
| 2015/0365569 A1 | 12/2015 | Mai et al. |
| 2016/0037028 A1 | 2/2016 | Biemer |
| 2017/0188467 A1 | 6/2017 | Steigerwald |
| 2017/0295352 A1 | 10/2017 | Ihlenburg et al. |

OTHER PUBLICATIONS

"Distance Monitoring Vision System for Automobiles using Image Processing"—Ambata et al., 8th IEEE International Conference Humanoid, Nanotechnology, Information Technology, Dec. 9-12, 2015 Water Front Hotel, Cebu, Philippines (Year: 2015).*

"Ethernet Video Analyzer for Vehicle"—Lajmi et al., 2014 International Conference on Connected Vehicles and Expo (ICCVE) (Year: 2014).*

* cited by examiner

VEHICLE VISION SYSTEM WITH ELECTRICAL NOISE FILTERING CIRCUITRY

CROSS REFERENCE TO RELATED APPLICATIONS

The present application is a continuation of U.S. patent application Ser. No. 17/656,072, filed Mar. 23, 2022, now U.S. Pat. No. 12,115,915, which is a continuation of U.S. patent application Ser. No. 15/379,800, filed Dec. 15, 2016, now U.S. Pat. No. 11,285,878, which claims the filing benefits of U.S. provisional application Ser. No. 62/268,742, filed Dec. 17, 2015, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more cameras (preferably one or more CMOS cameras) to capture image data representative of images exterior of the vehicle, and provides power to the camera or cameras via an Ethernet, LVDS or any other discrete or analog connection line (referred to herein as a connection line or image data transmission line), with the transmission line having a noise filter that filters noise from the signal or signals (such as a power signal) carried or communicated or transmitted by the transmission line.

The noise filter may comprise a-filter built of inductivities, capacitors, ferrets or any other passive form of active filter component disposed in line with a DC/DC converter that converts the supplied power for the camera. The camera may comprise the image processor or the image processor may be disposed remote from the camera. The video connection communicates data captured by the camera and/or communicates a control signal to the camera.

Thus, the camera is connected to a system of the vehicle via a transmission line, and the transmission line provides power to the camera and includes a noise filter that filters noise in the combined power and data signal of the transmission line.

Data transmitted between the camera and receiving ECU on the transmission line (with data transmitted in either one or both of the two directions) may be disturbed by the noise generated by either the camera or the receiving device. The filter keeps noise away from the transmission line, and thus increases the signal to noise ratio.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and process the image data to detect objects present in the field of view of the camera and/or to provide an output to a display device for displaying images representative of the captured image data. Optionally, the vision system may provide display, such as a rearview display or a top down or bird's eye or surround view display or the like.

Figure 1:
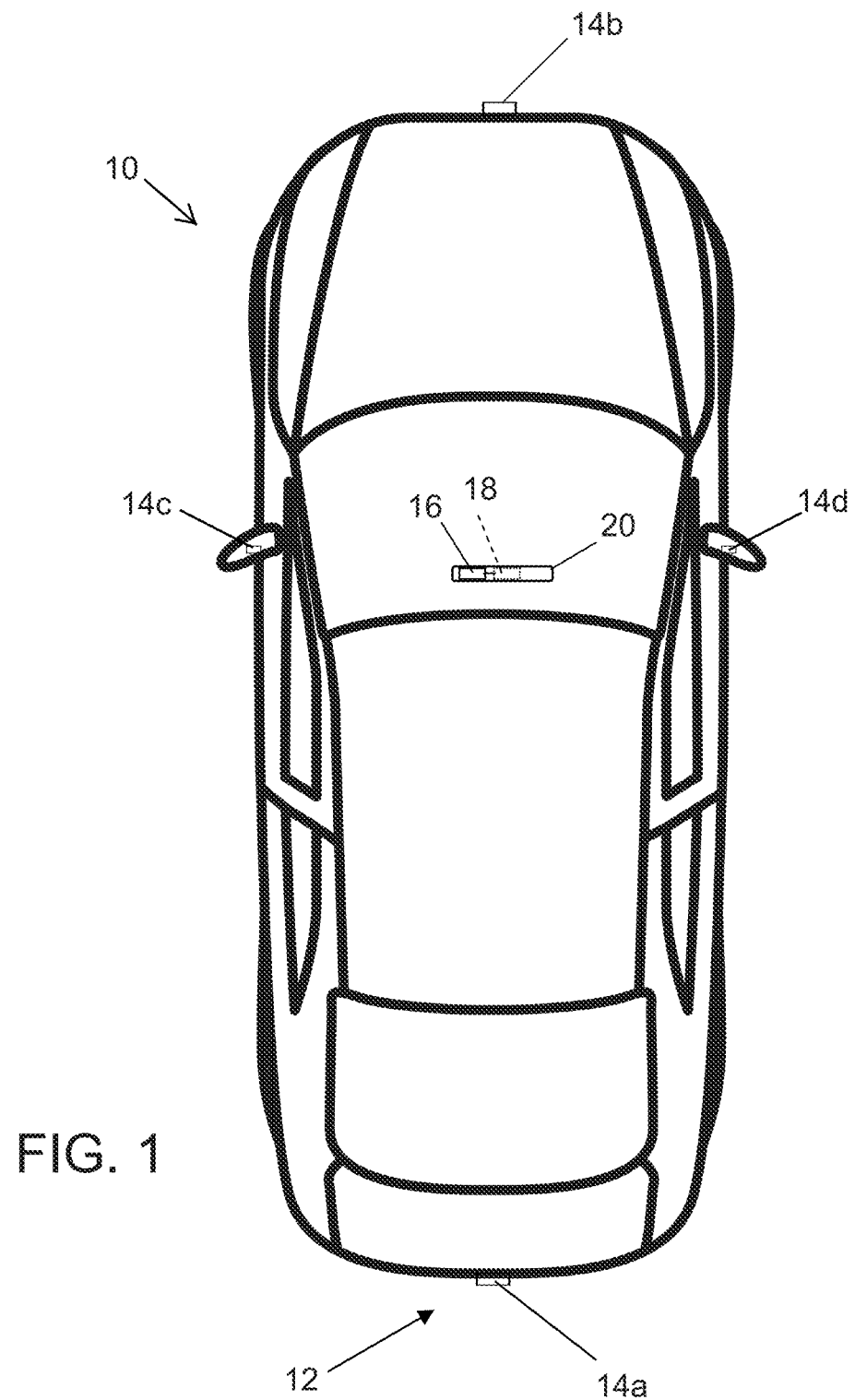
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

The vehicle camera is connected to a processor or system of the vehicle by a transmission line, which also features power over cable (also known in variants as Power over Coax—PoC or Power over Ethernet—PoE). Typical power over cable solutions without an additional noise filter on the DC/DC power supply of the camera suffer from noise back-fed through, or even generated by, the power supply.

Figure 2:
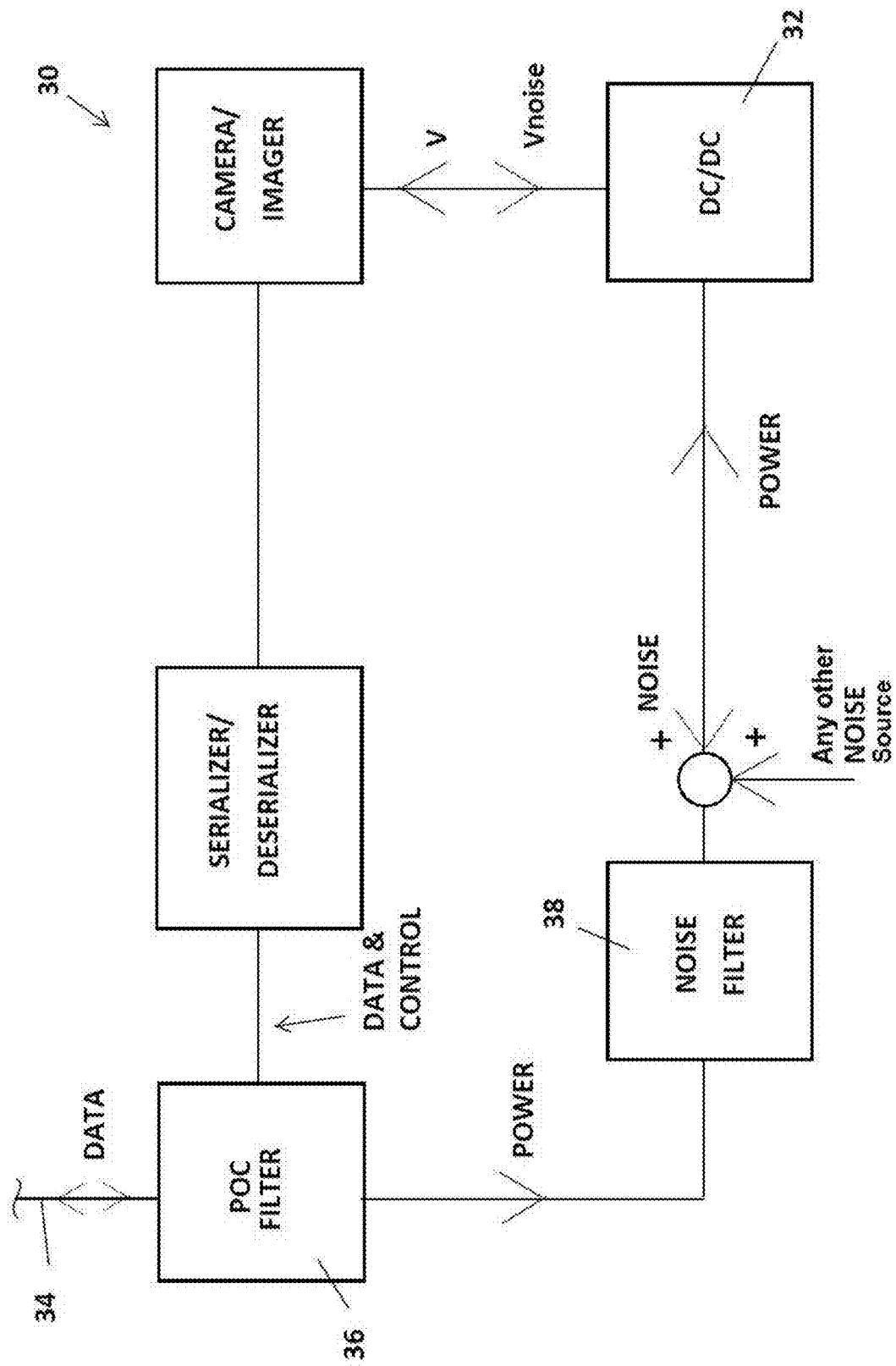
FIG. 2 is a block diagram showing the vision system and camera line power/noise filter in accordance with the present invention.

As shown in FIG. 2, the vision system or camera system of the present invention includes a camera 30 (which may be an interior viewing or exterior viewing camera disposed at the vehicle) having an imager (optionally with an image processor) and a switching or linear regulator—in the following referred to as DC/DC converter 32 that is connected to a transmission line cable 34 that provides power (POC 36) to the converter 32 and provides and/or receives data from the imager of the camera 30. As shown in FIG. 2, the present invention adds a noise filter 38 in front of the line power input port of the camera's primary DC/DC converter 32, and thus the camera supply current noise can be reduced.

The data or signal transmission line of the system of the present invention is at least capable of transmitting high definition image data captured by a vehicle camera. The image data transmission line is also operable to carry electrical power to the vehicle camera from a power source of the vehicle (such as, for example, an electronic control unit (ECU) of the vehicle that image processes image data transmitted to that ECU from at least one camera via such an image data transmission line). For example, such an image data transmission line operable to also carry electrical power/voltage can be a power over coax-PoC image data transmission line/cable or can be a power over Ethernet-PoE image data transmission line/cable.

Figure 3:
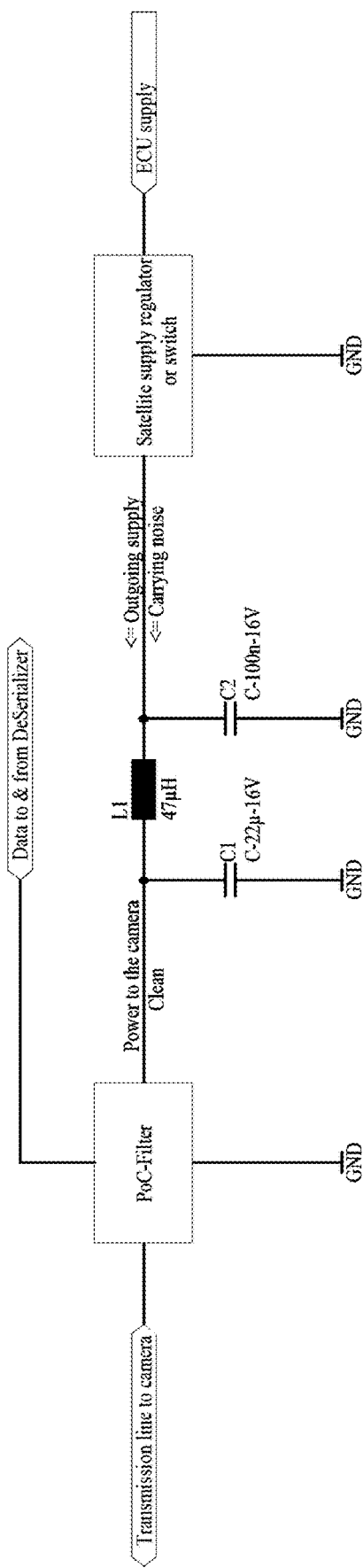
FIG. 3 is a block and circuit diagram showing the vision system and camera line power/noise filter in accordance with the present invention, with the noise filter realized by passive circuit elements.
Figure 4:
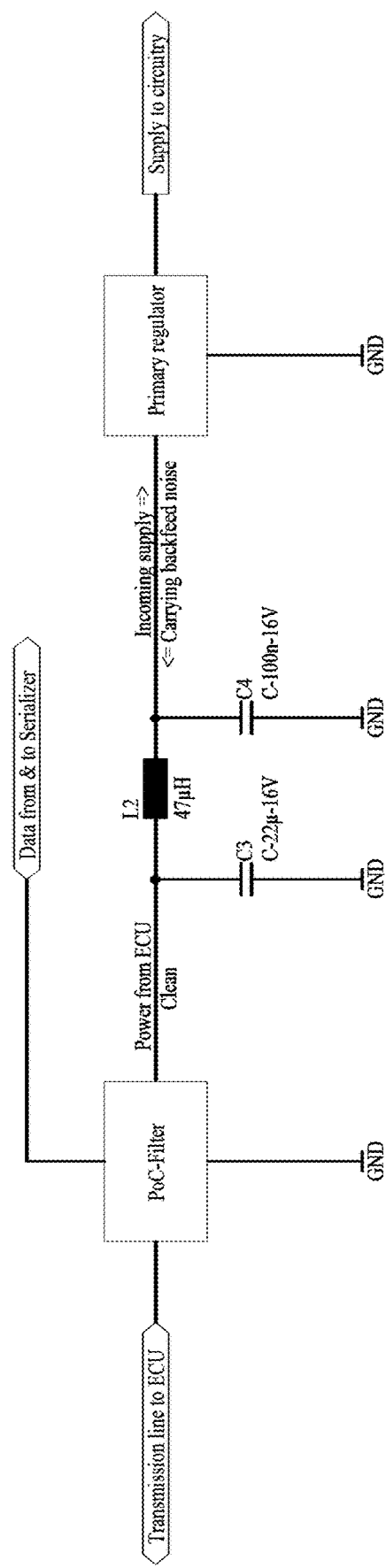
FIG. 4 is a block and circuit diagram showing the vision system and camera line power/noise filter in accordance with the present invention, with the noise filter realized by passive circuit elements.

The noise filter 38 may, in a simple form, comprise an electronic filtering circuit (comprising any passive components, such as, for example, inductors, capacitors, ferrets or resistors connected together) such as shown in FIGS. 3 and 4, or may comprise any active filter or even a combination of both.

The noise filter's parameters can be adapted to a noise that is known to be generated in the camera or ECU, or to the communication channel parameters (such as, for example, frequencies, bands or the like) that are used to do the actual communication.

Optionally, the quality or complexity of the DC/DC converter can be diminished which makes it less costly while achieving a comparable noise level on the output. A less complex DC/DC converter may do without a noise blocker or shunt loop control.

Optionally, a less expensive or complex data and power supply line or a line with more connector intersections or a longer line can be used, when a noise filter in front of the line power input port of the camera DC/DC converter is in use.

Therefore, the present invention provides a noise filter along the power feed to the camera (with the power provided via an image data transmission line cable that connects a camera to a vehicle system to control the camera and/or to feed data captured by the camera to a processor or system of the vehicle that is remote from the camera). The noise filter reduces supply voltage noise in the signal to the camera and the ECU, which enhances the signal to noise ratio, and thus leads to enhanced transmission distance capability and/or offers the possibility to use lower energy to transmit the data, possibly improving EMC emission. The image data captured by the camera may be processed by an image processor at the camera (where processed data or information is communicated or transmitted by the transmission line to a control unit or system of the vehicle) or by a processor remote from the camera (where the captured image data is communicated or transmitted to the processor via the transmission line or link).

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties.

Optionally, the vision system (utilizing the forward facing camera and a rearward facing camera and other cameras disposed at the vehicle with exterior fields of view) may be part of or may provide a display of a top-down view or bird's-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

The system may include an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

The imaging device and control and image processor and any associated illumination source, if applicable, may comprise any suitable components, and may utilize aspects of the cameras (such as various imaging sensors or imaging array sensors or cameras or the like, such as a CMOS imaging array sensor, a CCD sensor or other sensors or the like) and vision systems described in U.S. Pat. Nos. 5,760,962; 5,715,093; 6,922,292; 6,757,109; 6,717,610; 6,590,719; 6,201,642; 5,796,094; 6,559,435; 6,831,261; 6,822,563; 6,946,978; 7,720,580; 8,542,451; 7,965,336; 7,480,149; 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2009/036176; WO 2009/046268; WO 2010/099416; WO 2011/028686 and/or WO 2013/016409, and/or U.S. Pat. Publication Nos. US-2010-0020170 and/or US-2009-0244361, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular vision system, the vehicular vision system comprising:

a vehicular camera disposed at a vehicle equipped with the vehicular vision system;

wherein the vehicular camera comprises an imaging sensor having at least one million photosensor elements arranged in an array of rows and columns;

an electronic control unit (ECU) disposed at the equipped vehicle remote from the vehicular camera, wherein the ECU comprises an image processor operable to process image data captured by the vehicular camera;

wherein the ECU links to a vehicle network bus of the equipped vehicle;

wherein the vehicular camera is connected to the ECU via an image data transmission line, and wherein the image data transmission line comprises one selected from the group consisting of (i) a power-over-coaxial (POC) image data transmission line and (ii) a power-over-ethernet (POE) image data transmission line;

wherein the image data transmission line (i) transmits image data captured by the vehicular camera from the vehicular camera to the ECU and (ii) delivers electrical power from the ECU to the vehicular camera and (iii) communicates a control signal from the ECU to the vehicular camera;

wherein captured image data transmitted to the ECU from at least the vehicular camera is processed at the ECU for at least one driver assistance system of the equipped vehicle; and filtering circuitry that filters electrical noise arising at least from delivery of electrical power via the image data transmission line from the ECU to the vehicular camera.

2. The vehicular vision system of claim 1, wherein the filtering circuitry comprises a filter circuit of the vehicular camera that filters electrical noise arising from delivery of electrical power via the image data transmission line from the ECU to the vehicular camera for powering the vehicular camera.

3. The vehicular vision system of claim 2, wherein the filter circuit of the vehicular camera comprises an LC filter circuit of the vehicular camera comprising an inductor and a capacitor electrically connected.

4. The vehicular vision system of claim 2, wherein the vehicular camera comprises a DC/DC converter, and wherein the filter circuit of the vehicular camera is disposed between (i) the DC/DC converter of the vehicular camera and (ii) the image data transmission line that delivers electrical power from the ECU to the vehicular camera for powering the vehicular camera, and wherein the filter circuit of the vehicular camera is in line with the DC/DC converter of the vehicular camera.

5. The vehicular vision system of claim 2, wherein the vehicular camera comprises a linear voltage regulator, and wherein the filter circuit of the vehicular camera is disposed between (i) the linear voltage regulator and (ii) the image data transmission line that delivers electrical power from the ECU to the vehicular camera for powering the vehicular camera, and wherein the filter circuit of the vehicular camera is in line with the linear voltage regulator of the vehicular camera.

6. The vehicular vision system of claim 1, wherein the filtering circuitry comprises a filter circuit of the ECU that filters electrical noise arising at the ECU at least due to generation at the ECU of electrical power delivered via the image data transmission line from the ECU to the vehicular camera for powering the vehicular camera.

7. The vehicular vision system of claim 1, wherein the filtering circuitry comprises a filter circuit of the vehicular camera that filters electrical noise arising from delivery of electrical power via the image data transmission line from the ECU to the vehicular camera for powering the vehicular camera, and wherein the filtering circuitry comprises a filter circuit of the ECU that filters electrical noise arising at the ECU at least due to generation at the ECU of electrical power delivered via the image data transmission line from the ECU to the vehicular camera for powering the vehicular camera.

8. The vehicular vision system of claim 1, wherein the vehicular camera is disposed at a windshield of the equipped vehicle and views at least forward of the equipped vehicle through the windshield.

9. The vehicular vision system of claim 8, wherein the at least one driver assistance system of the equipped vehicle comprises at least two selected from the group consisting of (i) a lane departure warning system of the equipped vehicle, (ii) an object detection system of the equipped vehicle, (iii) a traffic sign recognition system of the equipped vehicle, (iv) a headlamp control system of the equipped vehicle, (v) a pedestrian detection system of the equipped vehicle and (iv) a collision avoidance system of the equipped vehicle.

10. The vehicular vision system of claim 1, wherein the vehicular camera comprises an interior-viewing camera.

11. The vehicular vision system of claim 10, wherein the at least one driver assistance system of the equipped vehicle comprises internal cabin surveillance.

12. The vehicular vision system of claim 1, wherein transmission of captured image data via the image data transmission line from the vehicular camera to the ECU utilizes Low Voltage Differential Signaling (LVDS).

13. The vehicular vision system of claim 1, wherein the vehicle network bus of the equipped vehicle comprises a Controller Area Network (CAN) bus.

14. The vehicular vision system of claim 1, wherein the image processor comprises an image processing chip, and wherein captured image data transmitted to the ECU from the vehicular camera is processed at the ECU by the image processing chip.

15. The vehicular vision system of claim 14, wherein, responsive to processing by the image processing chip of captured image data transmitted to the ECU from the vehicular camera, an object viewed by the vehicular camera is detected.

16. The vehicular vision system of claim 15, wherein the detected object comprises a vehicle.

17. The vehicular vision system of claim 15, wherein the detected object comprises a pedestrian.

18. The vehicular vision system of claim 15, wherein, responsive to detection of the object viewed by the vehicular camera, an alert is generated to enhance awareness by a driver of the equipped vehicle of the detected object.

19. A vehicular vision system, the vehicular vision system comprising:

a vehicular camera disposed at a vehicle equipped with the vehicular vision system, wherein the vehicular camera comprises an interior-viewing camera;

wherein the vehicular camera comprises an imaging sensor having at least one million photosensor elements arranged in an array of rows and columns;

an electronic control unit (ECU) disposed at the equipped vehicle remote from the vehicular camera, wherein the ECU comprises an image processor operable to process image data captured by the vehicular camera;

wherein the ECU links to a vehicle network bus of the equipped vehicle;

wherein the vehicular camera is connected to the ECU via an image data transmission line, and wherein the image data transmission line comprises a power-over-coaxial (POC) image data transmission line;

wherein the image data transmission line (i) transmits image data captured by the vehicular camera from the vehicular camera to the ECU and (ii) delivers electrical power from the ECU to the vehicular camera and (iii) communicates a control signal from the ECU to the vehicular camera;

wherein captured image data transmitted to the ECU from at least the vehicular camera is processed at the ECU for internal cabin surveillance; and filtering circuitry that filters electrical noise arising at least from delivery of electrical power via the image data transmission line from the ECU to the vehicular camera.

20. The vehicular vision system of claim 19, wherein the filtering circuitry comprises a filter circuit of the vehicular camera that filters electrical noise arising from delivery of electrical power via the image data transmission line from the ECU to the vehicular camera for powering the vehicular camera.

21. The vehicular vision system of claim 20, wherein the filter circuit of the vehicular camera comprises an LC filter circuit of the vehicular camera comprising an inductor and a capacitor electrically connected.

22. The vehicular vision system of claim 20, wherein the vehicular camera comprises a DC/DC converter, and wherein the filter circuit of the vehicular camera is disposed between (i) the DC/DC converter of the vehicular camera and (ii) the image data transmission line that delivers electrical power from the ECU to the vehicular camera for powering the vehicular camera, and wherein the filter circuit of the vehicular camera is in line with the DC/DC converter of the vehicular camera.

23. The vehicular vision system of claim 20, wherein the vehicular camera comprises a linear voltage regulator, and wherein the filter circuit of the vehicular camera is disposed between (i) the linear voltage regulator and (ii) the image data transmission line that delivers electrical power from the ECU to the vehicular camera for powering the vehicular camera, and wherein the filter circuit of the vehicular camera is in line with the linear voltage regulator of the vehicular camera.

24. The vehicular vision system of claim 19, wherein the filtering circuitry comprises a filter circuit of the ECU that filters electrical noise arising at the ECU at least due to generation at the ECU of electrical power delivered via the image data transmission line from the ECU to the vehicular camera for powering the vehicular camera.

25. The vehicular vision system of claim 19, wherein the filtering circuitry comprises a filter circuit of the vehicular camera that filters electrical noise arising from delivery of electrical power via the image data transmission line from the ECU to the vehicular camera for powering the vehicular camera, and wherein the filtering circuitry comprises a filter circuit of the ECU that filters electrical noise arising at the ECU at least due to generation at the ECU of electrical power delivered via the image data transmission line from the ECU to the vehicular camera for powering the vehicular camera.

26. The vehicular vision system of claim 19, wherein transmission of captured image data via the image data transmission line from the vehicular camera to the ECU utilizes Low Voltage Differential Signaling (LVDS).

27. The vehicular vision system of claim 19, wherein the vehicle network bus of the equipped vehicle comprises a Controller Area Network (CAN) bus.

28. A vehicular vision system, the vehicular vision system comprising:
a vehicular camera disposed at a windshield of a vehicle equipped with the vehicular vision system, and wherein the vehicular camera views at least forward of the equipped vehicle through the windshield;
wherein the vehicular camera comprises an imaging sensor having at least one million photosensor elements arranged in an array of rows and columns;
an electronic control unit (ECU) disposed at the equipped vehicle remote from the vehicular camera, wherein the ECU comprises an image processor operable to process image data captured by the vehicular camera;
wherein the ECU links to a vehicle network bus of the equipped vehicle;
wherein the vehicular camera is connected to the ECU via an image data transmission line, and wherein the image data transmission line comprises a power-over-coaxial (POC) image data transmission line;
wherein the image data transmission line (i) transmits image data captured by the vehicular camera from the vehicular camera to the ECU and (ii) delivers electrical power from the ECU to the vehicular camera and (iii) communicates a control signal from the ECU to the vehicular camera;
wherein captured image data transmitted to the ECU from at least the vehicular camera is processed at the ECU for at least one driver assistance system of the equipped vehicle; and
filtering circuitry that filters electrical noise arising at least from delivery of electrical power via the image data transmission line from the ECU to the vehicular camera.

29. The vehicular vision system of claim 28, wherein the filtering circuitry comprises a filter circuit of the vehicular camera that filters electrical noise arising from delivery of electrical power via the image data transmission line from the ECU to the vehicular camera for powering the vehicular camera.

30. The vehicular vision system of claim 29, wherein the filter circuit of the vehicular camera comprises an LC filter circuit of the vehicular camera comprising an inductor and a capacitor electrically connected.

31. The vehicular vision system of claim 29, wherein the vehicular camera comprises a DC/DC converter, and wherein the filter circuit of the vehicular camera is disposed between (i) the DC/DC converter of the vehicular camera and (ii) the image data transmission line that delivers electrical power from the ECU to the vehicular camera for powering the vehicular camera, and wherein the filter circuit of the vehicular camera is in line with the DC/DC converter of the vehicular camera.

32. The vehicular vision system of claim 29, wherein the vehicular camera comprises a linear voltage regulator, and wherein the filter circuit of the vehicular camera is disposed between (i) the linear voltage regulator and (ii) the image data transmission line that delivers electrical power from the ECU to the vehicular camera for powering the vehicular camera, and wherein the filter circuit of the vehicular camera is in line with the linear voltage regulator of the vehicular camera.

33. The vehicular vision system of claim 28, wherein the filtering circuitry comprises a filter circuit of the ECU that filters electrical noise arising at the ECU at least due to generation at the ECU of electrical power delivered via the image data transmission line from the ECU to the vehicular camera for powering the vehicular camera.

34. The vehicular vision system of claim 28, wherein the filtering circuitry comprises a filter circuit of the vehicular camera that filters electrical noise arising from delivery of electrical power via the image data transmission line from the ECU to the vehicular camera for powering the vehicular camera, and wherein the filtering circuitry comprises a filter circuit of the ECU that filters electrical noise arising at the ECU at least due to generation at the ECU of electrical power delivered via the image data transmission line from the ECU to the vehicular camera for powering the vehicular camera.

35. The vehicular vision system of claim 28, wherein the at least one driver assistance system of the equipped vehicle comprises at least two selected from the group consisting of (i) a lane departure warning system of the equipped vehicle, (ii) an object detection system of the equipped vehicle, (iii) a traffic sign recognition system of the equipped vehicle, (iv) a headlamp control system of the equipped vehicle, (v) a pedestrian detection system of the equipped vehicle and (iv) a collision avoidance system of the equipped vehicle.

36. The vehicular vision system of claim 28, wherein transmission of captured image data via the image data transmission line from the vehicular camera to the ECU utilizes Low Voltage Differential Signaling (LVDS).

37. The vehicular vision system of claim 28, wherein the vehicle network bus of the equipped vehicle comprises a Controller Area Network (CAN) bus.

38. The vehicular vision system of claim 28, wherein, responsive to processing of captured image data transmitted to the ECU from the vehicular camera, an object viewed by the vehicular camera is detected.

39. The vehicular vision system of claim 38, wherein the detected object comprises a vehicle.

40. The vehicular vision system of claim 38, wherein the detected object comprises a pedestrian.

41. The vehicular vision system of claim 38, wherein, responsive to detection of the object viewed by the vehicular camera, an alert is generated to enhance awareness by a driver of the equipped vehicle of the detected object.

* * * * *